A. J. MISENHEIMER.
Corn Planter and Cultivator.
No. 94,835. Patented Sept. 14, 1869.
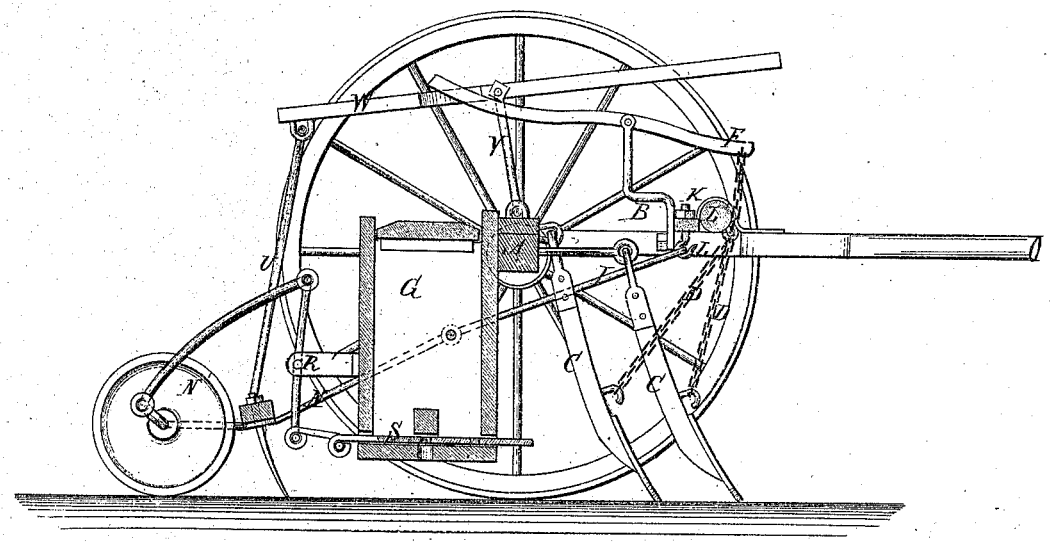
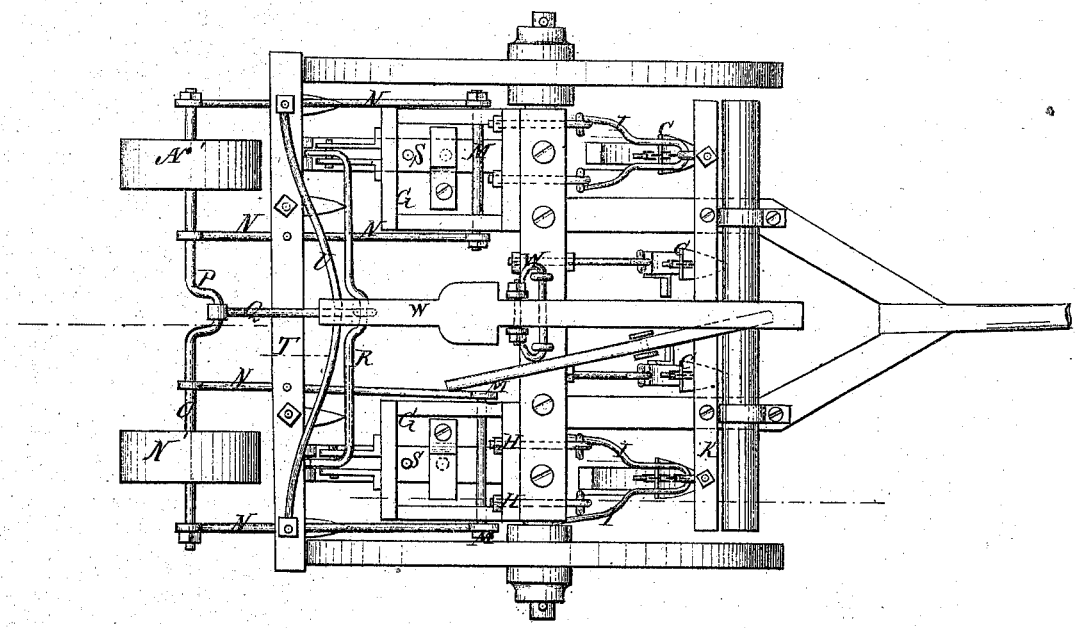
Witnesses:
Chas. Nida
Geo. W. Mabee
Inventor:
A. J. Misenheimer
per
Attorneys.

United States Patent Office.

A. J. MISENHIMER, OF OSKALOOSA, ILLINOIS.

Letters Patent No. 94,835, dated September 14, 1869.

IMPROVEMENT IN PLANTER AND CULTIVATOR.

The Schedule referred to in these Letters Patent and making part of the same.

*To all whom it may concern:*

Be it known that I, A. J. MISENHIMER, of Oskaloosa, in the county of Clay, and State of Illinois, have invented a new and improved Planter and Cultivator; and I do hereby declare that the following is a full, clear, and exact description thereof, which will enable others skilled in the art to make and use the same, reference being had to the accompanying drawings, forming part of this specification.

The object of this invention is to provide a planting-attachment for cultivators, which may be readily applied to or detached from the cultivators, and to provide a simple and efficient arrangement of the said planting-attachment.

Figure 1 represents a sectional elevation of my improved apparatus; and

Figure 2 represents a plan view of the same.

Similar letters of reference indicate corresponding parts.

A represents the axle of the truck usually employed, and

B, the tongue.

C are the cultivator-plows, hinged to the axle or to projections therefrom, and connected by cords D to a roller, E, for winding, to regulate the pitch of the cultivators, or to raise them off the ground, the said roller being provided with a lever, F.

G represents seed-boxes, detachably connected to the axle by the same bolts, H, by which the outer cultivators are secured. The said boxes are also supported by crotched braces, I, connected, by hooks L, on the cross-bar K.

From the connecting-bolts M of these braces running rearward, are rods or bars N, supporting the axle O of the wheels employed for pressing the earth down upon the seed. This axle is made to work the valves or gates for dropping the seed, by means of a crank, P, connecting-rod Q, and a vibrating bent rod, R, to which the said valves are connected.

This rod R is caused to oscillate on the pivots R', giving a swinging motion to the lower ends of the bent parts to which the valves are connected.

T represents a cross-bar, connected to the rods N, in front of the wheels N'. From this bar, covering cultivating-teeth are suspended, and a yoke, U, is also connected to the said bar, and rises up to the rear end of a vibrating lever, W, having a vibrating fulcrum, X, rising up from the axle A, and serving as a seat for the operator. This lever projects considerably beyond the axle, and is intended to raise the wheels N' off the ground when turning around, or at any time when they are not required to work the gates. This is effected by the weight of the rider being moved to the front of the fulcrum.

When the wheels N' are working out he ground, the operator sits behind the fulcrum, and he may in this way, to a considerable extent, regulate the pressure of the wheels N' on the ground.

This planting-attachment may be readily removed by detaching the seed-boxes from the bolts H, unhooking the braces I, and disconnecting the seat-lever W.

Having thus described my invention,

I claim as new, and desire to secure by Letters Patent—

1. The combination of the seed-boxes G, axle A, crotched braces I, and hooks L, when constructed and arranged substantially as specified.

2. The combination of the seed-boxes G, connecting-rods N, cranked axle O, wheels N', connecting-rod Q, oscillating-rod K, and valves S, all arranged substantially as specified.

3. The described arrangement of the vibrating fulcrum V, oscillating seat-support or lever W, yoke U, cross-bar T, rods N, and wheel N', with reference to each other, as set forth and shown.

A. J. MISENHIMER.

Witnesses:
EDMOND N. CREEKMUR,
M. SYMONDS.